(12) United States Patent
Kwon et al.

(10) Patent No.: US 10,086,832 B2
(45) Date of Patent: Oct. 2, 2018

(54) VEHICLE AND METHOD FOR CONTROLLING THE SAME

(71) Applicant: Hyundai Motor Company, Seoul (KR)

(72) Inventors: Yongseok Kwon, Gyeonggi-do (KR); Sukki Min, Gyeonggi-do (KR); Donghyun Sung, Gyeonggi-do (KR); Junghyun Kim, Seoul (KR); Sangmin Lee, Seoul (KR); Taeyoung Lee, Gyeonggi-do (KR); Eungseo Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/469,676

(22) Filed: Mar. 27, 2017

(65) Prior Publication Data

US 2018/0170373 A1 Jun. 21, 2018

(30) Foreign Application Priority Data

Dec. 20, 2016 (KR) .................. 10-2016-0174536

(51) Int. Cl.
*B60Q 1/12* (2006.01)
*B60W 30/095* (2012.01)
(Continued)

(52) U.S. Cl.
CPC ......... *B60W 30/0956* (2013.01); *B60Q 1/085* (2013.01); *B60W 10/04* (2013.01); *B60W 10/18* (2013.01); *B60W 10/30* (2013.01); *B60W 30/09* (2013.01); *B60W 30/143* (2013.01); *B60W 50/14* (2013.01); *G08G 1/165* (2013.01);
(Continued)

(58) Field of Classification Search
CPC ......... B60W 30/0956; B60W 50/0225; B60W 30/00; B60Q 1/12; B60Q 1/143; B60Q 1/1423; B60Q 1/04; H04L 5/0023; B60N 2/06

See application file for complete search history.

(56) References Cited

U.S. PATENT DOCUMENTS

| 5,430,450 A * | 7/1995 | Holmes .................. B60Q 1/143 |
| | | 342/69 |
| 9,764,683 B2 * | 9/2017 | Illiunn ................. B60Q 1/1423 |

(Continued)

FOREIGN PATENT DOCUMENTS

| JP | 2013203251 A | 10/2013 |
| KR | 10-2000-0039268 | 7/2000 |
| KR | 10-2011-0121145 | 5/2013 |

*Primary Examiner* — Yuri Kan

(74) *Attorney, Agent, or Firm* — Mintz Levin Cohn Ferris Glovsky and Popeo, P.C.; Peter F. Corless

(57) ABSTRACT

A vehicle and method for controlling the same are provided to improve recognition performance of a camera by irradiating light from a headlamp to an object, which may be recognized by a detection sensor but not by the camera, thereby avoiding a collision by detecting the object using both the camera and detection sensor. The vehicle includes an optical sensor that detects illumination around the vehicle and a detection sensor that detects an object around the vehicle to obtain information regarding at least one of a position and speed of the object. A controller operates a headlamp to irradiate light toward the object based on the position information of the object when the detected illumination is less than a predetermined value.

16 Claims, 12 Drawing Sheets

(51) Int. Cl.
*B60W 30/14* (2006.01)
*B60W 30/09* (2012.01)
*B60W 50/14* (2012.01)
*B60Q 1/08* (2006.01)
*B60W 10/04* (2006.01)
*B60W 10/18* (2012.01)
*B60W 10/30* (2006.01)
*G08G 1/16* (2006.01)

(52) U.S. Cl.
CPC ......... *G08G 1/166* (2013.01); *B60Q 2300/45* (2013.01); *B60W 2050/143* (2013.01); *B60W 2050/146* (2013.01); *B60W 2420/42* (2013.01); *B60W 2420/52* (2013.01); *B60W 2510/18* (2013.01); *B60W 2520/10* (2013.01); *B60W 2550/10* (2013.01); *B60W 2710/18* (2013.01); *B60W 2720/10* (2013.01)

(56) References Cited

U.S. PATENT DOCUMENTS

| | | | |
|---|---|---|---|
| 2002/0156559 A1* | 10/2002 | Stam | B60Q 1/1423 701/36 |
| 2010/0052550 A1* | 3/2010 | Kobayashi | B60Q 1/143 315/158 |
| 2010/0149827 A1* | 6/2010 | Kettern-Kohler | B60Q 1/12 362/507 |
| 2013/0238186 A1 | 9/2013 | Aimura | |
| 2013/0343071 A1 | 12/2013 | Nagaoka et al. | |
| 2014/0246975 A1* | 9/2014 | Futamura | B60Q 1/143 315/82 |
| 2015/0151725 A1* | 6/2015 | Clarke | B60W 30/00 701/28 |
| 2016/0323075 A1* | 11/2016 | Jeong | H04L 5/0023 |
| 2017/0001637 A1* | 1/2017 | Nguyen Van | B60W 50/0225 |
| 2017/0036565 A1* | 2/2017 | Ohno | B60N 2/06 |
| 2018/0170241 A1* | 6/2018 | Mizuno | B60Q 1/04 |

\* cited by examiner

VEHICLE AND METHOD FOR CONTROLLING THE SAME

CROSS-REFERENCE TO RELATED APPLICATION

This application claims priority to and the benefit of Korean Patent Application No. 10-2016-0174536, filed on Dec. 20, 2016, the disclosure of which is incorporated herein by reference in its entirety.

BACKGROUND

1. Field of the Disclosure

The present disclosure relates to a vehicle and method for controlling the same, and more particularly, to a technology that improves recognition performance of an imaging device by irradiating light from a headlamp to an object, which may be recognized by a detection sensor but not by the imaging device, thereby avoiding a collision by detecting the object using both the imaging device and detection sensor.

2. Discussion of Related Art

Generally, vehicles are used to transport people or goods to destinations while being driven along the roads or tracks. A vehicle is able to move to various locations by one or more wheels installed onto the frame of the vehicle. Such vehicles may be classified into three- or four-wheel vehicles, a two-wheel vehicle such as a motorcycle, construction machinery, bicycles, trains traveling along rails on the tracks, and the like.

In modern society, vehicles are the most common transportation means, and the amount of people using the vehicles is ever increasing. With the development of automobile technology, there are advantages of moving a long distance without much effort, but also problems often arise in that traffic conditions worsen and traffic jams increase where population densities are high.

Accordingly, to increase driver convenience, recent studies have been conducted regarding vehicles equipped with an Advanced Driver Assist System (ADAS) that actively provides information regarding a state of the vehicle, a state of the driver, and surrounding conditions. As an example of the ADAS equipped in the vehicle, there are a Forward Collision Avoidance (FCA) and an Autonomous Emergency Brake (AEB). These systems are collision avoidance systems that determine the risk of colliding with vehicles in the opposite direction or at the crossroads and execute urgent braking in the situation of the collision.

For effective implementation of the collision avoidance system, an object around the vehicle is detected using a combination of detection sensors and imaging devices such as cameras mounted within the vehicle, and there is an increasing need for a technology to improve the image capturing performance of the imaging device even in low light conditions around the vehicle driven at night to detect the object more accurately.

SUMMARY

The present disclosure provides a vehicle and method for controlling the same, to improve recognition performance of an imaging device by irradiating light from a headlamp to an object, which may be recognized by a detection sensor but not by the imaging device, thereby avoiding a collision by detecting the object using both the imaging device and detection sensor.

In accordance with another aspect of the present disclosure, a vehicle may include: an optical sensor configured to detect illumination around the vehicle, a detection sensor configured to detect an object around the vehicle to obtain information regarding at least one of position and speed of the object, a controller configured to transmit a control signal to operate a headlamp to irradiate light toward the object based on the information regarding the position of the object when the detected illumination is less than a predetermined value and a headlamp configured to irradiate light toward the object based on the control signal.

The controller may further be configured to calculate a time to collision (TCC) of the vehicle and the object (e.g., when the vehicle and object will collide) based on the information regarding at least one of the position and speed of the object. The controller may be configured to transmit a control signal to operate the headlamp to irradiate light toward the object when the TCC is less than a predetermined time. The controller may further be configured to adjust an amount of light to be irradiated from the headlamp toward the object, based on a distance from the vehicle to the object. The amount of light to be irradiated from the headlamp toward the object may also be adjusted based on the TCC of the vehicle with the object.

The vehicle may further include: a capturer or imaging device configured to capture an image of an object located in a direction in which the light from the headlamp is irradiated, to detect the object. The capturer may be configured to determine a type of object based on the image captured of the object. The controller may be configured to determine the object to be subject to collision avoidance control based on information regarding at least one of position and speed of the object obtained by the detection sensor and the image of the object captured by the capturer. The controller may then be configured to adjust driving speed of the vehicle based on the TCC of the vehicle with the object. The vehicle may further include: a speed controller configured to adjust driving speed of the vehicle based on the control signal. The detection sensor may include one of a radar and a light detection and ranging (LiDAR).

In accordance with another aspect of the present disclosure, a method for controlling a vehicle may include: detecting illumination around the vehicle; detecting an object around the vehicle to obtain information regarding at least one of position and speed of the object; transmitting a control signal to operate a headlamp to irradiate light toward the object based on the information regarding the position of the object when the detected illumination is less than a predetermined value; and irradiating light toward the object based on the control signal.

The method for controlling a vehicle may further include: calculating time to collision (TCC) of the vehicle with the object based on the information regarding at least one of the position and speed of the object. The transmission of a control signal to operate a headlamp may include: transmitting a control signal to operate the headlamp to irradiate light toward the object when the TCC is less than a predetermined time.

Further, the transmission of a control signal to operate a headlamp may include: adjusting an amount of light to be irradiated from the headlamp toward the object, based on a distance from the vehicle to the object. The transmission of a control signal to operate a headlamp may also include:

adjusting an amount of light to be irradiated from the headlamp toward the object, based on the TCC of the vehicle against the object.

The method for controlling a vehicle may further include: capturing an image of an object located in a direction in which the light from the headlamp is irradiated, to detect the object and determining a type of object based on the image captured of the object. The method for controlling a vehicle may further include: determining the object to be subject to collision avoidance control based on information regarding at least one of position and speed of the object obtained by a detection sensor and the image of the object captured by a capturer (e.g., imaging device, camera, etc.). The method for controlling a vehicle may further include: adjusting driving speed of the vehicle based on the TCC of the vehicle with the object and adjusting the driving speed of the vehicle based on the control signal.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION

Figure 1:
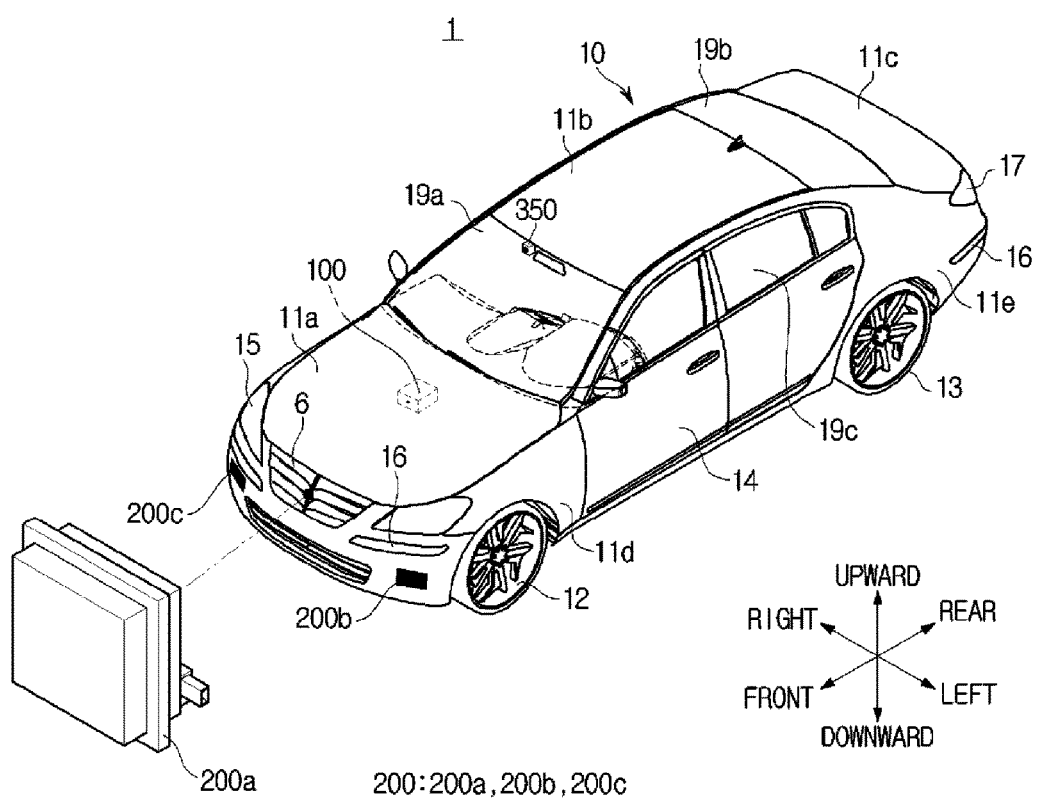
FIG. 1 is a perspective view schematically illustrating the exterior of a vehicle, according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Like numerals refer to like elements throughout the specification. Not all elements of embodiments of the present disclosure will be described, and description of what are commonly known in the art or what overlap each other in the exemplary embodiments will be omitted. The terms as used throughout the specification, such as "~ part", "~ module", "~ member", "~ block", etc., may be implemented in software and/or hardware, and a plurality of "~ parts", "~ modules", "~ members", or "~ blocks" may be implemented in a single element, or a single "~ part", "~ module", "~ member", or "~ block" may include a plurality of elements. It will be further understood that the term "connect" or its derivatives refer both to direct and indirect connection, and the indirect connection includes a connection over a wireless communication network.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section.

Reference numerals used for method steps are merely used for convenience of explanation, but not to limit an order of the steps. Thus, unless the context clearly dictates otherwise, the written order may be practiced otherwise. The principle and exemplary embodiments of the present disclosure will now be described with reference to accompanying drawings.

Figure 2:
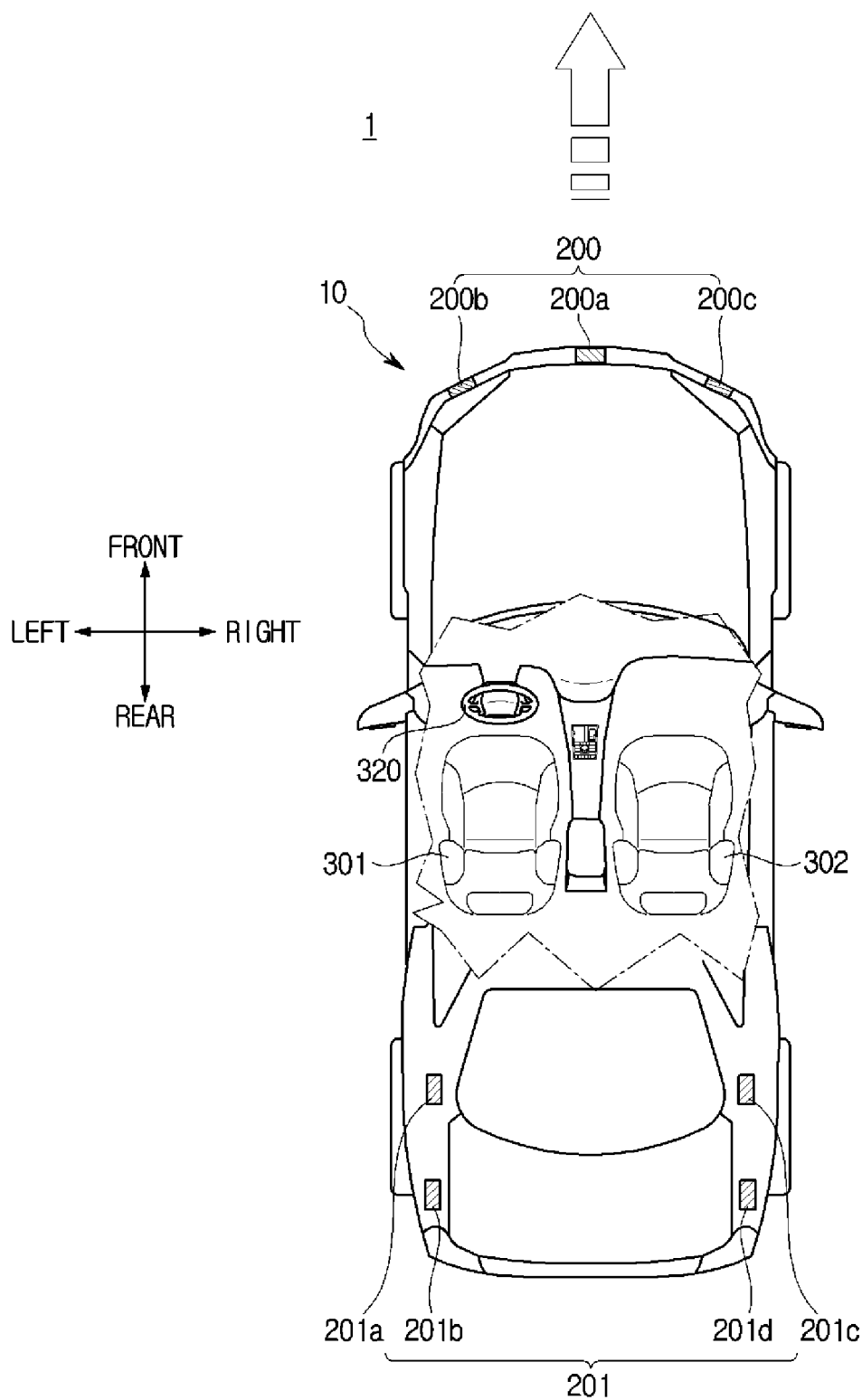
FIG. 2 shows a vehicle equipped with a detection sensor, according to an exemplary embodiment of the present disclosure.
Figure 3:
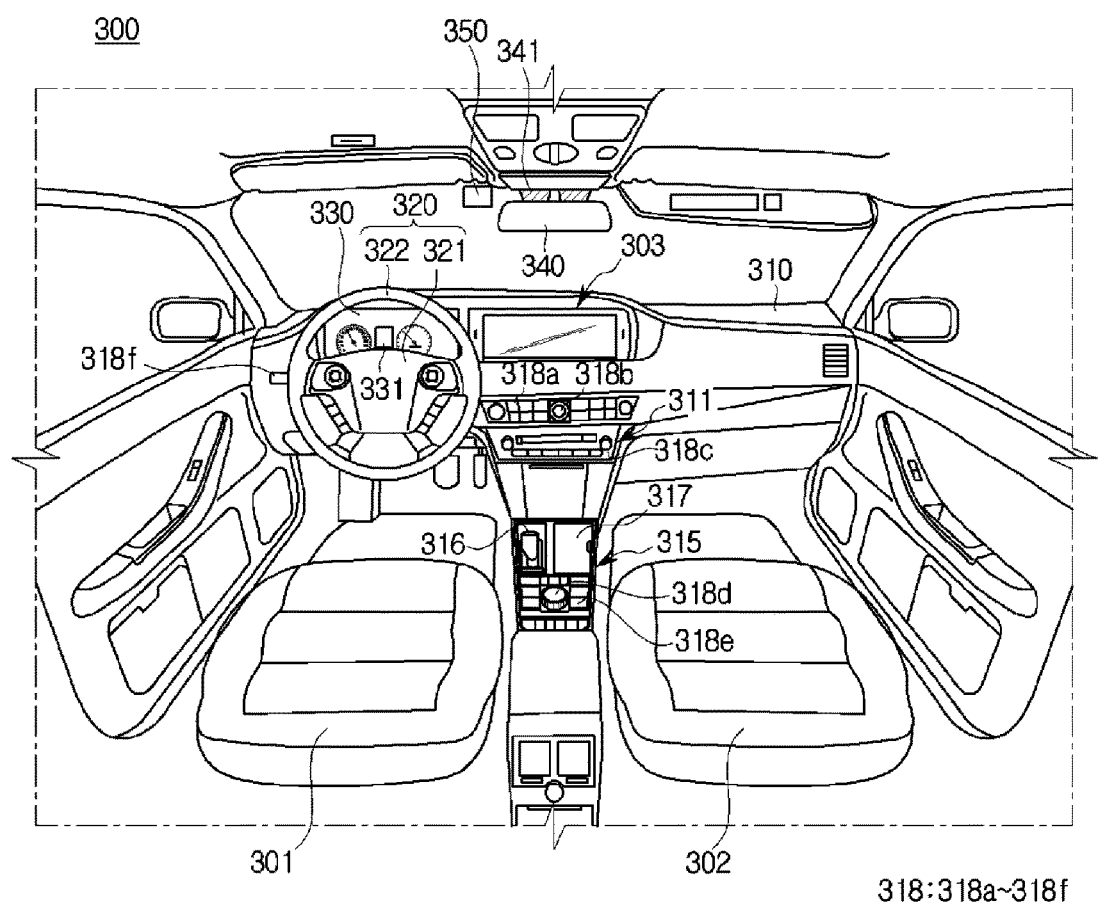
FIG. 3 shows internal features of a vehicle, according to an exemplary embodiment of the present disclosure.
Figure 4:
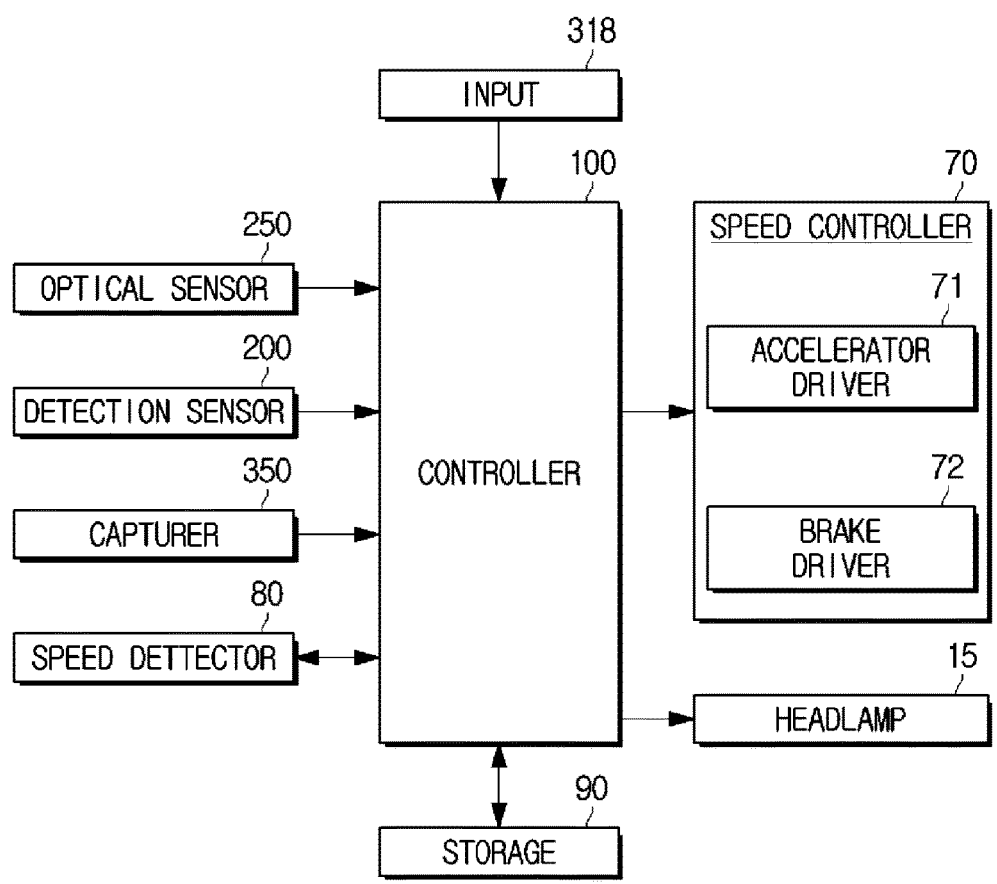
FIG. 4 is a control block diagram of a vehicle, according to an exemplary embodiment of the present disclosure.

FIG. 1 is a perspective view schematically illustrating the exterior of a vehicle, according to an exemplary embodiment of the present disclosure. FIG. 2 shows a vehicle equipped with detection sensors, according to an exemplary embodiment of the present disclosure, FIG. 3 shows internal features of a vehicle, according to an exemplary embodiment of the present disclosure, and FIG. 4 is a control block diagram of a vehicle, according to an exemplary embodiment of the present disclosure.

For convenience of explanation, as shown in FIG. 1, a direction in which a vehicle 1 travels will be referred to as a forward direction, and left and right directions are distinguished based on the forward direction. When the forward direction corresponds to a twelve o'clock position, the right direction is defined to correspond to the three o'clock position or around the three o'clock position, and the left direction is defined to correspond to the nine o'clock position or around the nine o'clock position. The opposite direction of the forward direction is the rear direction. Additionally, a direction down to the floor of the vehicle 1 will be referred to as a downward direction, and a direction opposite to the downward direction will be referred to as an upward direction. Furthermore, a side located ahead will be referred to as a front side, a side located behind will be referred to as a rear side, and sides located on either sides will be referred to as sides. The sides include left and right sides.

Referring to FIG. 1, a vehicle 1 may include a vehicle body 10 that forms the exterior, and wheels 12, 13 for moving the vehicle 1. The vehicle body 10 may include a hood 11a for protecting various devices required for driving the vehicle 1, a roof panel 11b that forms an indoor space, a trunk lid 11c of a trunk, front fenders 11d disposed on the sides of the vehicle 1, and quarter panels 11e. There may be a plurality of doors 15 disposed on the sides of the vehicle body 10 and hinged to the vehicle body 10.

A front window 19a is disposed between the hood 11a and the roof panel 11b for providing a view ahead of the vehicle 1, and a rear window 19b is disposed between the roof panel 11b and the trunk lid 11c for providing a view behind the vehicle 1. Side windows 19c may also be disposed at the upper part of the doors 15 to provide side views. Headlamps 15 may be disposed on the front of the vehicle 1 for illuminating a direction in which the vehicle 1 travels. The headlamps 15 may irradiate light to provide a more clear view of an object around the vehicle 1, and also secure a field of view of the front of the vehicle 1. The headlamps 15 may include light sources, which may be halogen lamps, high intensity discharges, or light emitting diodes, without being limited thereto.

Furthermore, as will be described below, the headlamps 15 may irradiate light toward an object around the vehicle 1, with the amount or direction of irradiation of light from the lamp toward the object varying by distance between the vehicle 1 and the object, moving speed of the object, and/or expected time for the vehicle 1 to collide with the object, under the operation of a controller 100. Turn signal lamps 16 may also be disposed on the front and back of the vehicle 1 for indicating a direction in which the vehicle 1 will turn. The vehicle 1 may blink the turn signal lamp 16 to indicate a turning direction. Tail lamps 17 may also be disposed on the back of the vehicle 1. The tail lamps 17 may indicate a state of gear shift, a state of brake operation of the vehicle 1, etc.

As shown in FIGS. 1 and 3, at least one capturer 350 (e.g., imaging device, camera, video camera, etc.) may be provided within the vehicle 1. The capturer 350 may be configured to capture an image around the vehicle 1 while the vehicle is being driven or stopped, and further obtain information regarding a type and position of the object. The object captured around the vehicle 1 may include another vehicle, pedestrian, bicycle, road barrier, etc., and may further include a moving object or various fixed obstacles.

The capturer 350 may be configured to detect a type of object around the vehicle 1 by capturing the object and identifying a shape of the captured object through image recognition, and transmit the detected information to the controller 100. By using a combination of an image captured by the capturer 350 and information regarding the object detected by the detection sensor 200, the controller 100 may be configured to obtain more accurate information regarding the type, position, and/or moving speed of the object around the vehicle 1.

Figure 5:
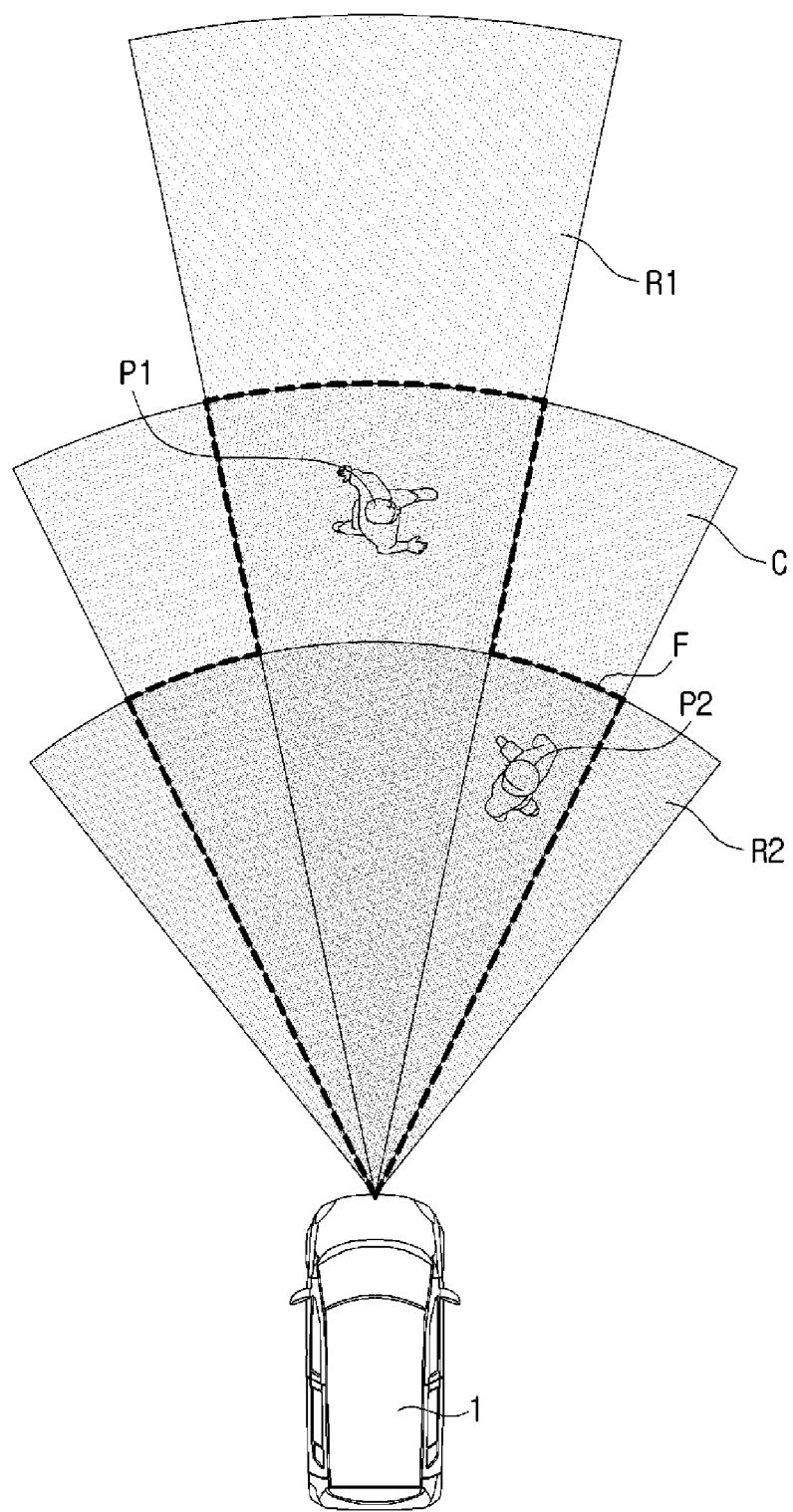
FIG. 5 is a conceptual diagram illustrating how a vehicle detects an object using a detection sensor and a capturer, according to an exemplary embodiment of the present disclosure.

FIG. 5 is a conceptual diagram illustrating how a vehicle detects an object using a detection sensor and a capturer, according to an exemplary embodiment of the present disclosure. While the vehicle is being driven, the capturer 350 may be configured to capture at least one object located in front of the vehicle 1, determine a type of object based on the captured image, and transmit the information regarding the determined type of object to the controller 100.

As shown in FIG. 5, the capturer 350 may be configured to capture an image of the surroundings of the vehicle 1, and a capture area C captured by the capturer 350 may vary in dimensions and distance according to settings of the capturer 350. The capturer 350 may be configured to obtain image information by capturing an image of pedestrians P1, P2 located in the capture area C, obtain information regarding positions and moving speeds of the pedestrians P1, P2 through image recognition, and transmit the information to the controller 100.

While the capturer 350 may be disposed around a mirror 340 of the vehicle (e.g., rearview mirror) in FIG. 3, the location of the capturer 350 is not limited thereto, and may be disposed at any place within the vehicle that allows the capturer 350 to obtain image information by capturing an image of the inside or outside of the vehicle 1. The capturer 350 may include at least one imaging device or camera, and further include a three dimensional (3D) space recognition sensor, radar sensor, ultrasound sensor, etc., to capture a more accurate image. For the 3D space recognition sensor, a KINECT (RGB-D sensor), TOF (Structured Light Sensor), stereo camera, or the like may be used, without being limited thereto, and any other devices having the similar function may also be used.

Furthermore, the capturer 350 may be configured to identify a type of object around the vehicle 1 by capturing an image of the object, and further obtain information regarding coordinates of the captured object with respect to the vehicle 1 and transmit the coordinate information to the controller 100. As the object moves around the vehicle 1, the coordinates and moving speed of the object may vary in real time, and as the vehicle 1 moves as well, the position and speed thereof may vary in real time. The capturer 350 may thus be configured to detect the object by capturing an image of the object in real time when the object is moving around. The information regarding the type and position of the captured object may be stored in a storage 90 or memory, and the stored information may be used by the controller 100 for performing collision avoidance control of the vehicle 1 with the object.

Referring to FIGS. 1 and 2, the vehicle 1 may include a detection sensor 200 configured to detect an object located in front of the vehicle 1 to obtain information regarding at least one of position and moving speed of the object. In an exemplary embodiment, the detection sensor 200 may be configured to obtain information regarding coordinates of the object located around the vehicle 1 based on the vehicle 1 position. In other words, the detection sensor 200 may be configured to obtain the coordinate information in real time, which may vary as the object moves, and detect a distance between the vehicle 1 and the object.

Referring to FIG. 5, the detection sensor 200 may be configured to detect an object located in front of the vehicle 1, obtain information regarding a position of the object, and obtain coordinate information of the object, which may vary as the object moves. Furthermore, the detection sensor 200 may be configured to detect or measure a distance between the vehicle 1 and the object based on the information regarding the coordinates of the object, and obtain information regarding a speed at which the object moves around the vehicle 1. Specifically, the detection sensor 200 may be configured to obtain information about transverse moving speed and longitudinal moving speed of a moving object in front of the vehicle 1.

As shown in FIG. 5, a direction in which an object is detected or a detection area may vary based on a type and installation position of the detection sensor 200, and the detection area may vary even according to setting values of the detection sensor 200. For example, an object in a short-range detection area R2 from the vehicle 1 may be detected, and an object in a long-range detection area R1 may be detected. As will be described below, the controller 100 may be configured to calculate a relative distance and relative speed between the vehicle 1 and an object based on the information regarding position and speed of the object obtained by the detection sensor 200, and calculate time to collision (TTC) of the vehicle 1 with the object based on the calculation result.

The detection sensor 200 may be installed in an appropriate position within the object at which an object, e.g., another vehicle, located in front, to a side, or to a front side of the vehicle 1 may be recognized, as shown in FIGS. 1 and 2. In an exemplary embodiment, the detection sensor 200 may be installed on the front and both sides of the vehicle 1 to recognize all objects located in front of the vehicle 1, in a direction between the left side and front (hereinafter, referred to as 'front-left') of the vehicle 1 and in a direction between the right side and the front (front-right) of the vehicle 1.

For example, a first detection sensor 200a may be installed in a part, e.g., on the inner side of a radiator grill 6, or may be installed at any place of the vehicle 1 allowing detection of a vehicle in front of the vehicle 1. Furthermore, a second detection sensor 200b may be disposed on a left side of the vehicle 1, and a third detection sensor 200c may be disposed on a right side of the vehicle 1.

The detection sensor 200 may be configured to detect whether another vehicle is present or approaching from the left side, right side, front-left side, or front-right side using electromagnetic waves or laser beams. For example, the detection sensor 200 may be configured to emit electromagnetic waves such as micro waves or millimeter waves, pulsed laser beams, ultrasounds, or infrared rays in the left, right, front, back, front-left, front-right, rear-left, or rear-right direction, and detect whether an object is present by receiving electromagnetic waves, pulsed laser beams, ultrasounds, infrared rays, or the like, reflected or scattered from the object. In particular, the detection sensor 200 may further be configured to determine a distance between the vehicle 1 and the object or moving speed of the object based on time taken for the emitted electromagnetic waves, pulsed laser beams or infrared rays to be returned.

Alternatively, the detection sensor 200 may be configured to detect whether an object by receiving visible rays reflected or scattered from the object located in the left, right, and front directions. As described above, based on which one of electromagnetic waves, pulsed laser beams, ultrasounds, infrared rays, and visible rays is used, a recognized distance to the object located in front or back of the vehicle 1 may be different, and the weather or illumination may affect whether the object is recognized. Taking this into account, while the vehicle 1 is being driven in a particular direction along a particular road lane, the controller 100 of the vehicle 1 may be configured to determine whether there are moving objects in front of the vehicle 1, and front-left and front-right sides to the vehicle 1, and obtain information regarding position and speed of the objects.

The detection sensor 200 may be implemented with many different devices, such as a radar using millimeter waves or micro waves, a light detection and ranging (LiDAR) using pulsed laser beams, a vision using visible rays, an infrared sensor using infrared rays, an ultrasound sensor using ultrasounds, and/or the like. The detection sensor 200 may be implemented with any one of them or any combination of them. When several detection sensors 200 may be mounted on the vehicle 1, the detection sensors 200 may be implemented with the same type or different types of devices. The detection sensors 200 may be implemented with other various devices or combinations of them that may be considered by the designer.

Referring to FIG. 5, the controller 100 of the vehicle 1 may be configured to recognize more accurate information regarding a position and speed of an object around the vehicle 1 based on image information obtained by the capturer 350 configured to capture the object and information obtained by the detection sensor 200 configured to detect the object. The controller 100 may be configured to determine a type of object around the vehicle 1 based only on the image information obtained by the capturer 350 and obtain information regarding position and speed of the object, and also obtain the information regarding position and speed of the object based on detection results of the detection sensor 200. Using a combination of the image information of the object captured by the capturer 350 and the information detected by the detection sensor 200, the controller 100 may be configured to obtain more accurate information regarding position and speed of the object.

Referring to FIG. 5, the detection sensor 200 may be configured to obtain detection information regarding an object in the long-range area R1 and the short-range area R2, and the capturer 350 may be configured to capture an image of a capture area C to detect an object located within the capture area C. The controller 100 may further be configured to obtain information regarding position and moving speed of an object based on a combination of the detection information obtained by the detection sensor 200 and the image information obtained by the capturer 350, but when an area even detected by the detection sensor 200 is not the capture area C detected by the capturer 350, the combination of the information obtained by the detection sensor 200 and capturer 350 may not be used.

Accordingly, for an object located in a common area F between the capture area C of the capturer 350 and the detection area R1, R2 of the detection sensor 200, the controller 100 may be configured to use a combination of information obtained by the detecting sensor 200 and information obtained by the capturer 350. Therefore, more accurate information regarding position and speed of the object located in the common area F may be obtained, and based on this more accurate information, the controller 100 may be configured to perform more accurate collision avoidance control of the vehicle 1 within the object located in the common area F.

Referring to FIG. 3, an interior 300 of the vehicle 1 includes a driver seat 303, a passenger seat 304 adjacent to the driver seat 303, a dashboard 310, a steering wheel 320, and an instrument panel 330. The dashboard 310 refers to a panel that separates the interior room from the engine room and that has various parts required for driving installed thereon. The dashboard 310 is disposed in front of the driver seat 303 and passenger seat 304. The dashboard 310 may include a top panel, a center fascia 311, a gear box 315, and the like.

On the top panel of the dashboard 310, a display 303 may be installed. The display 303 may be configured to output various information in the form of images to the driver or passenger of the vehicle 1. For example, the display 303 may be configured to output various information, such as maps, weather, news, various moving or still images, information regarding status or operation of the vehicle 1, e.g., information regarding the air conditioner, etc. Furthermore, the display 303 may provide the driver or passenger with an alert that corresponds to a level of danger to the vehicle 1. Specifically, when the vehicle 1 is about to change lanes, different alerts may be output to the driver according to different levels of danger. The display 303 may be implemented with a commonly-used navigation system.

Further, the display 303 may be installed inside a housing integrally formed with the dashboard 310 such that the display 301 may be exposed. Alternatively, the display 303 may be installed in the middle or the lower part of the center fascia 311, or may be installed on the inside of the windshield (not shown) or on the top of the dashboard 310 by a separate supporter (not shown). The display 303 may be installed at any position that may be considered by the designer.

Behind the dashboard 310, various types of devices, such as a processor, a communication module, a global positioning system (GPS) module, a storage, etc., may be installed. The processor installed within the vehicle 1 may be configured to operate various electronic devices installed in the vehicle 1, and may operate as the controller 100. The aforementioned devices may be implemented using various parts, such as semiconductor chips, switches, integrated circuits, resistors, volatile or nonvolatile memories, PCBs, and/or the like.

The center fascia 311 may be installed in the middle of the dashboard 310, and may include input 318a to 318c configured to receive various instructions related to the vehicle 1 from user input or selection. The input 318a to 318c may be implemented with mechanical buttons, knobs, a touch pad, a touch screen, a stick-type manipulation device, a trackball, or the like. The driver may execute many different operations of the vehicle 1 by manipulating the different inputs 318a to 318c.

The gear box 315 is disposed below the center fascia 311 between the driver seat 301 and the passenger seat 302. In the gear box 315, a transmission 316, a container box 317, various input 318d to 318e, etc., are included. The inputs 318d to 318e may be implemented with mechanical buttons, knobs, a touch pad, a touch screen, a stick-type manipulation device, a trackball, or the like. The container box 317 and input 318d to 318e may be omitted in some exemplary embodiments.

The steering wheel 320 and an instrument panel 330 are disposed on the dashboard 310 in front of the driver seat 303. The steering wheel 320 may be rotated in a particular direction by manipulation of the driver, and accordingly, the front or back wheels of the vehicle 1 are rotated, thereby steering the vehicle 1. The steering wheel 320 may include a spoke 321 connected to a rotation shaft and a wheel for gripping 322 combined with the spoke 321. On the spoke 321, an input may be provided configured to receive various instructions as input from a user, and the input may be implemented with mechanical buttons, knobs, a touch pad, a touch screen, a stick-type manipulation device, a trackball, or the like.

The wheel for gripping 322 may have a radial form to be conveniently manipulated by the driver, but is not limited thereto. Inside of at least one of the spoke 321 and the wheel for gripping 322, a vibrator 201 (in FIG. 4) may be installed for allowing at least one of the spoke 321 and the wheel for gripping 322 to vibrate at a particular intensity according to an external control signal. In some exemplary embodiments, the vibrator 201 may be configured to vibrate at various intensities based on external control signals, and accordingly, at least one of the spoke 321 and the wheel 322 for gripping may vibrate at various intensities. The vibrator 201 may be used to in the vehicle 1 to provide haptic alerts or feedback to the driver.

For example, at least one of the spoke 321 and the wheel for gripping 322 may vibrate to an extent that corresponds to a level of danger determined when the vehicle 1 changes lanes. In particular, various alerts may be provided to the driver. Specifically, as the level of danger increases, the vibration of at least one of the spoke 321 and the handle for gripping 322 increases to provide a high level of alert to the driver. Furthermore, a turn signal indicator input 318f may be disposed in the back of the steering wheel 320. The user may input a signal to change driving direction or lanes through the turn signal indicator input 318f while driving the vehicle 1.

Further, the instrument panel 330 provides the driver with various information relating to the vehicle 1, such as speed of the vehicle 1, engine revolutions per minute (rpm), fuel left, temperature of engine oil, flickering of turn signals, a distance traveled by the vehicle, etc. The instrument panel 330 may be implemented with lights, indicators, or the like, and it may be implemented with a display panel as well, in some exemplary embodiments. When the instrument panel 330 is implemented with the display panel, in addition to the aforementioned information, the instrument panel 330 may provide other various information such as gas mileage, whether various functions of the vehicle 1 are performed, or the like to the driver via the display. The instrument panel 330 may be configured to output and provide different alerts for the user based on different levels of danger to the vehicle 1. Specifically, when the vehicle 1 is about to change lanes, the instrument panel 330 may provide different alerts to the driver based on differently determined levels of danger (e.g., danger levels being associated with, for example, probability or likelihood of collision with another vehicle during the lane change).

Referring to FIG. 4, the vehicle 1 in an exemplary embodiment may include a speed controller 70 configured to adjust the driving speed of the vehicle 1 driven by the driver, a speed detector 80 configured to measure or detect the driving speed of the vehicle 1, a storage 90 configured to store data related to operation of the vehicle 1, a controller 100 configured to operate the respective components of the vehicle 1 and adjust the driving speed of the vehicle 1, and an optical sensor 250 configured to detect illumination around the vehicle 1.

Particularly, the speed controller 70 may be configured to adjust the speed of the vehicle 1 driven by the driver. The speed controller 70 may include an accelerator driver 71 and a brake driver 71. The accelerator driver 71 may be configured to increase speed of the vehicle 1 by activating the accelerator upon reception of a control signal from the controller 100, and the brake driver 72 may be configured to decrease speed of the vehicle by activating the brake upon reception of a control signal from the controller 100. The controller 100 may be further be configured to increase or decrease the driving speed of the vehicle 1 to increase or decrease the distance between the vehicle to an object based on the distance between the vehicle 1 and the object and a predetermined reference distance stored in the storage 90.

Furthermore, the controller 100 may be configured to calculate an estimated collision time TTC of the vehicle 1 with the object based on relative distance and relative speed between the vehicle 1 and the object, and transmit a signal to adjust the driving speed of the vehicle 1 to the speed controller 70 based on the calculated TTC. The speed controller 70 may be operated by the controller 100 to adjust the driving speed of the vehicle 1, and decrease the driving speed of the vehicle 1 when the risk of collision between the vehicle 1 and another vehicle is high (e.g., a high risk being associated with a likelihood of collision based on detected factors). The speed controller 80 may be configured to detect the driving speed of the vehicle 1 driven by the driver. Specifically, the speed controller 80 may be configured to detect the driving speed using the rotation speed of the wheels of the vehicle 1, and a unit of the driving speed may be represented in KPH, meaning a distance (km) traveled per unit hour (h).

The storage 90 may be configured to store various data related to operation of the vehicle 1. In an exemplary embodiment, the storage 90 may be configured to store information regarding driving speed, traveled distance, and traveled time of the vehicle 1, and further store information regarding a type and position of an object detected by the capturer 350. Furthermore, the storage 90 may be configured to store information regarding a position and speed of an object detected by the detection sensor 200, coordinate information of a moving object, which varies in real time, and information regarding a relative distance and relative speed between the vehicle 1 and an object.

In addition, the storage 90 may be configured to store data related to mathematical formulas and control algorithms used in operating the vehicle 1 in an exemplary embodiment, and the controller 1 may be configured to transmit (e.g., send) control signals to operate the vehicle 1 according to the formulas and control algorithms. The storage 90 may be implemented with at least one of a non-volatile memory device, such as cache, read only memory (ROM), programmable ROM (PROM), erasable programmable ROM (EPROM), electrically erasable programmable ROM (EEPROM), a volatile memory device, such as random access memory (RAM), or a storage medium, such as hard disk drive (HDD) or compact disk (CD) ROM, without being limited thereto. The storage 90 may be a memory implemented with a chip separate from the aforementioned processor in relation to the controller 100, or may be implemented integrally with the processor in a single chip.

Referring to FIGS. 1 and 4, an optical sensor 250 may be mounted within the vehicle 1 to detect illumination around the vehicle 1. The optical sensor 250 may be installed in a particular position in the vehicle 1 to detect illumination around the vehicle 1, convert the detected illumination to an electric signal, and transmit the converted signal to the controller 100. The controller 100 may be configured to determine illumination around the vehicle 1 by comparing the detected illumination around the vehicle 1 transmitted from the optical sensor 250 and predetermined illumination data. In other words, the controller 100 may be configured to determine whether the vehicle 1 is driven in day or night, or through a bright region or dark region.

There are no limitations regarding where to install the optical sensor 250, and the optical sensor 250 may be installed inside or outside of the vehicle 1 as long as it may detect illumination around the vehicle 1. At least one controller 100 may be included in the vehicle 1. The controller 100 may be configured to perform electronic control over the respective components associated with operation of the vehicle 1.

Figure 6:
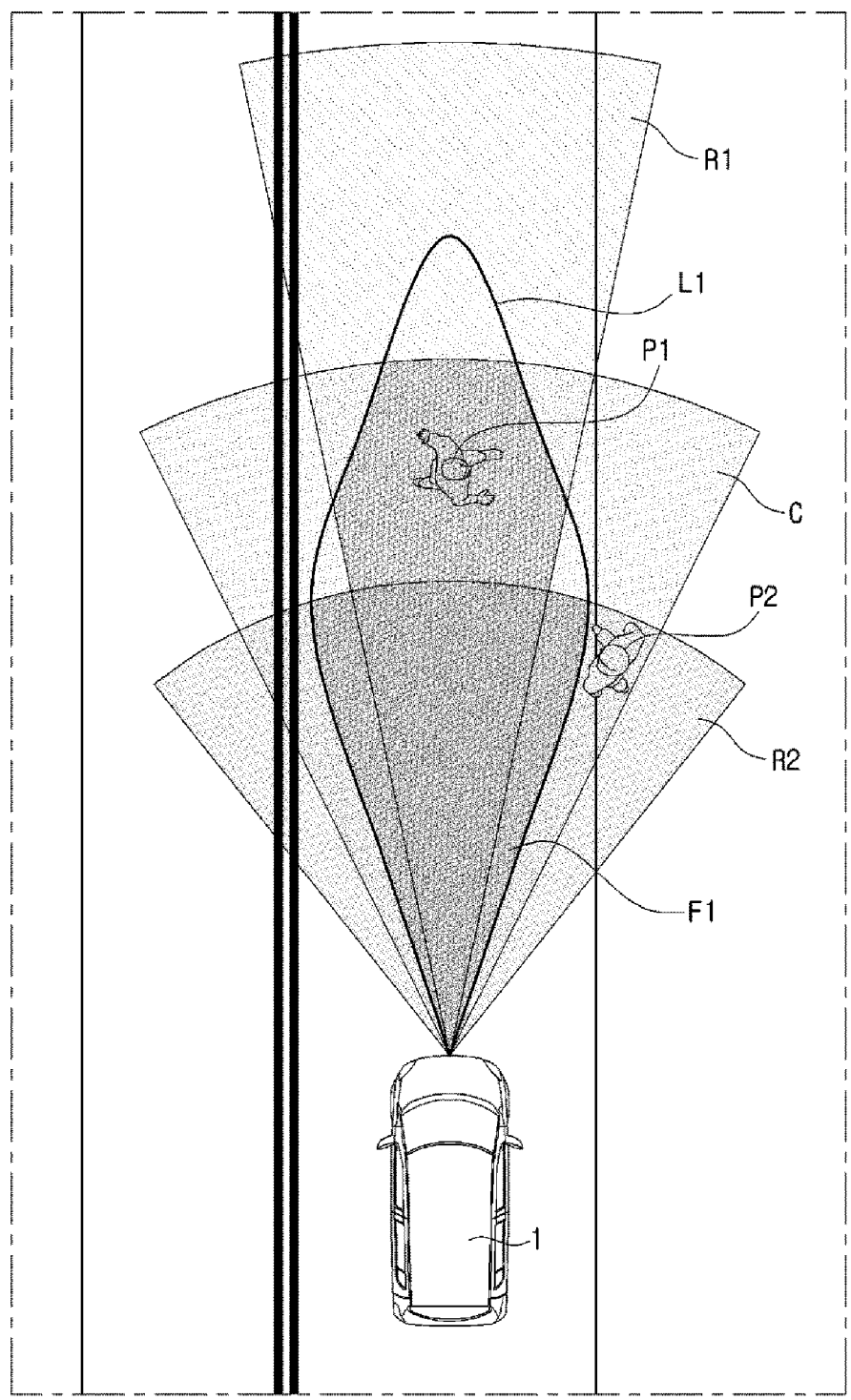
FIG. 6 shows areas where objects are detected while a headlamp of a vehicle irradiates light, according to an exemplary embodiment of the present disclosure.
Figure 7:
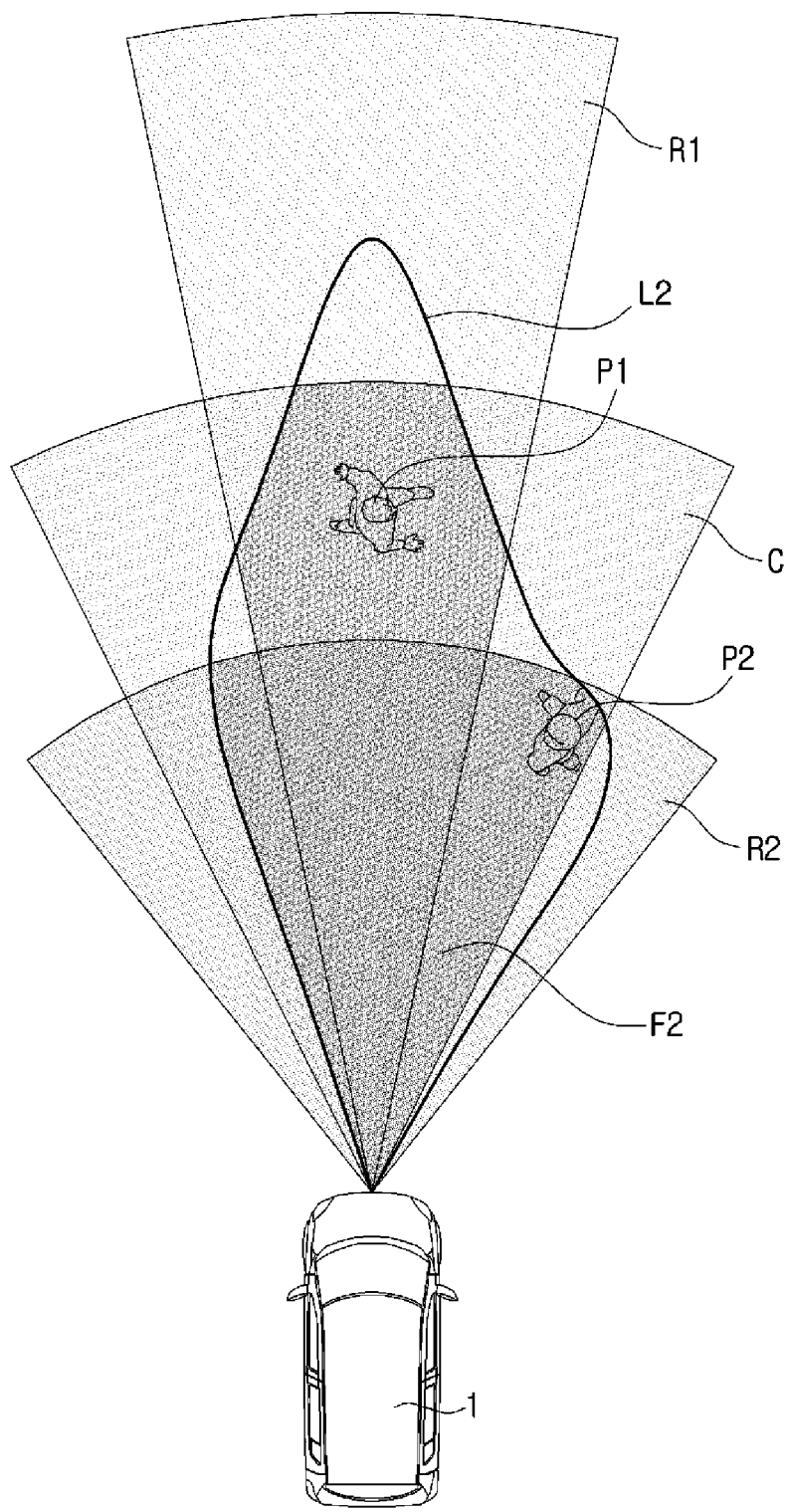
FIG. 7 is a conceptual diagram illustrating how to operate a headlamp to irradiate light toward an object, according to an exemplary embodiment of the present disclosure.

FIG. 6 shows areas where objects are detected while a headlamp of a vehicle irradiates light, according to an exemplary embodiment of the present disclosure, and FIG. 7 is a conceptual diagram illustrating how to operate a headlamp to irradiate light toward where there is an object, according to an exemplary embodiment of the present disclosure. Referring to FIG. 6, while the vehicle 1 is being driven, the capturer 350 may be configured to obtain information regarding an image of an object located in the capture area C by capturing the surroundings of the vehicle 1 and obtain information regarding a position and moving speed of the object through recognition of the image.

The detection sensor 200 may be configured to obtain detection information regarding an object in the long-range area R1 or the short-range area R2, and using a combination of the image information of the object captured by the capturer 350 and the information detected by the detection sensor 200, the controller 100 may be configured to obtain more accurate information regarding position and speed of the object.

When the vehicle 1 is being driven in a bright day or through a bright light region, illumination around the vehicle 1 is high and thus, the capturer 350 may be configured to capture and recognize an object around the vehicle 1, in which case a high-resolution bright image may be captured and thus more accurate information regarding the object may be obtained through accurate image recognition. Specifically, referring to FIG. 6, when the vehicle 1 is being driven through a bright region, first and second pedestrians P1 and P2 may both be captured and detected in the capture area C, and information regarding positions and moving speeds of the first and second pedestrians P1 and P2 may be obtained through image recognition. Accordingly, while the vehicle 1 is being driven through a bright region, the controller 100 may use a combination of detection information obtained by the detection sensor 200 and image information obtained by the capturer 350 for an object to obtain more accurate information regarding a position and moving speed of the object.

On the other hand, when the vehicle 1 is being driven at night or through a dark light region, illumination around the vehicle 1 is low and thus, even when the capturer 350 captures an image of an object around the vehicle, the image has a low resolution. Thus, it may be difficult to obtain more accurate information regarding the object through image recognition. When the object is detected based on the image obtained by the capturer 350, quality of the image may be low and thus, time to detect an object located at a far distance may be delayed or increased. Accordingly, the field of view of an object around the vehicle 1 may be secured by the headlamp 15 equipped in the vehicle 1 irradiating light forward of the vehicle 1 (e.g., a traveling direction of the vehicle).

Once light is irradiated from the headlamp 15, an image for an area L1 illuminated by the irradiated light captured by the capturer 350 may be bright and improved, and so a high-resolution image may be obtained. For example, referring to FIG. 6, for the first pedestrian P1 in an overlapping area between the capture area C of the capturer 350 and the area L1 illuminated by light from the headlamp 15, the capturer 350 may be configured to capture an image and recognize the first pedestrian P1. For the second pedestrian P2 in a non-overlapping area between the capture area C of the capturer 350 and the area L1 illuminated by light from the headlamp 15, the capturer 350 may be configured to capture an image with difficulty in recognizing the second pedestrian P2 due to the low illustration around the second pedestrian P2. Accordingly, the first pedestrian P1 may be recognized based on the image captured by the capturer 350, and more accurate information regarding a position and moving speed of the first pedestrian P1 may be obtained using a combination of the image information and detection information for the long-range area R1 detected by the detection sensor 200.

However, the second pedestrian P2 in the area not illuminated by light from the headlamp 15 may not be recognized by capturing the image by the capturer 350, and thus, when the second pedestrian P2 is in the short-range detection area R2 that the detection sensor 200 is able to detect, the detection information obtained by the capturer 350 may not be used. Instead, only the information detected by the detection sensor 200 may be used to obtain information regarding a position and moving speed of the second pedestrian P2. In particular, collision avoidance control of the vehicle 1 with the pedestrian P2 may not be performed effectively. Accordingly, a need exists for a method for controlling the vehicle 1, by which the lighting direction from the headlamp 15 may be adjusted for the capturer 350 to be able to properly capture an image of e.g., the second pedestrian P2.

Referring to FIG. 7, the controller 100 may be configured to transmit a control signal to operate the headlamp 15 to irradiate light toward a direction in which an object is present, based on the information regarding the position of the object obtained by the detection sensor 200, and the headlamp 15 may be configured to irradiate light toward the direction of the object according to the control signal. For example, the optical sensor 250 mounted within the vehicle 1 may be configured to detect illumination around the vehicle 1 while the vehicle 1 is being driven. The optical sensor 250 may then be configured to convert the illumination around the vehicle 1 to an electric signal, and transmit the electric signal to the controller 100.

The controller 100 may be configured to determine illumination around the vehicle 1 by comparing the illumination around the vehicle 1 transmitted from the optical sensor 250 and predetermined illumination data stored beforehand in the storage 90. A number of illumination data may be stored in the storage 90, in which case day-time illumination values and night-time illumination values may be stored separately. Based on the illumination values, the headlamp 15 may be automatically activated, and when the illumination around the vehicle 1 detected by the optical sensor 250 is less than a predetermined value, the headlamp 15 may be configured to irradiate light forward of the vehicle 1. Different illumination values may be stored according to settings.

When the illumination around the vehicle 1 is less than the predetermined illumination value, the controller 100 may be configured to determine that the vehicle 1 is being driven at night and transmit a control signal to operate the headlamp to irradiate light toward a direction of an object detected by the detection sensor 200. Referring to FIG. 7, when the controller 100 determines that the vehicle 1 is being driven at night, the detection sensor 200 may be configured to detect the second pedestrian P2 in the short-range detection area R2 to obtain information regarding a position and speed of the second pedestrian P2, and the controller 100 may be configured to transmit a control signal to operate the headlamp 151 to irradiate light toward where the second pedestrian P2 is present.

The headlamp 15 may be configured to irradiate light toward the second pedestrian P2 according to the control signal transmitted from the controller 100. Once light is irradiated from the headlamp 15 to the second pedestrian P2, when the capturer 350 captures an image for the light-shed area L1 (light-illuminated area), a bright image with high resolution may be captured and obtained.

Accordingly, for the second pedestrian P2 located in a common area F2 between the capture area C of the capturer 350 and the short-range detection area R2 of the detection sensor 200, the controller 100 may use a combination of information obtained by the detecting sensor 200 and information obtained by the capturer 350. The controller 110 may more accurately detect a position and moving speed of the second pedestrian P2 even while the vehicle 1 is being driven at night, based on the information regarding a position and speed of the second pedestrian P2 detected by the detection sensor 200 and image recognition information of the second pedestrian P2 captured by the capturer 350.

Figure 8:
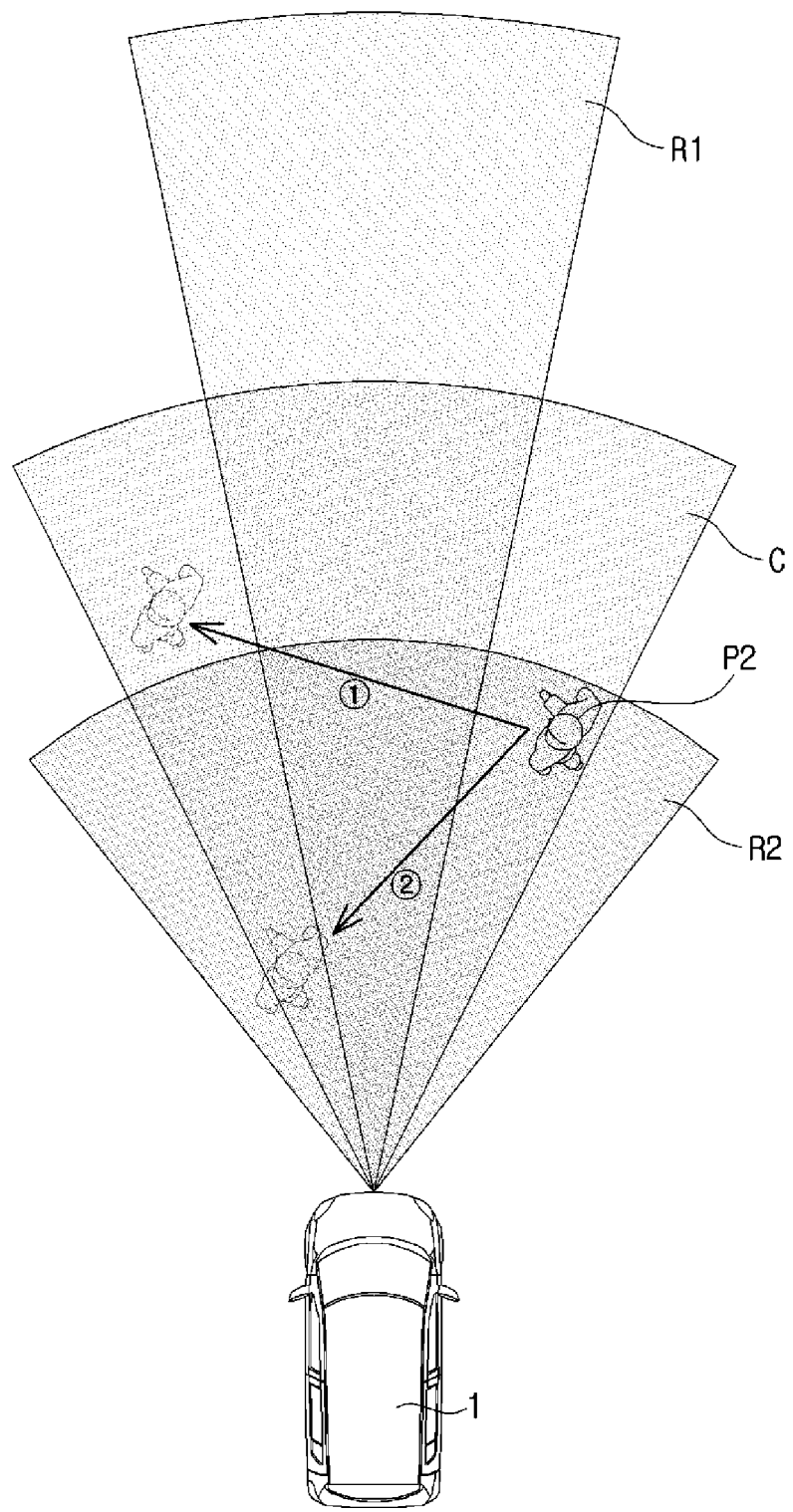
FIG. 8 shows how a detection sensor detects a moving direction and moving speed of a pedestrian, according to an exemplary embodiment of the present disclosure.

FIG. 8 shows how a detection sensor detects a moving direction and moving speed of a pedestrian, according to an exemplary embodiment of the present disclosure. As described above in connection with FIG. 7, while the vehicle 1 is being driven at night, the controller 100 may be configured to operate the headlamp 15 to irradiate light toward an object detected by the detection sensor 200, and in this regard, based on the moving direction or moving speed of the object, change irradiation of light from the headlamp 15.

For example, the controller 100 may be configured to calculate TTC of the vehicle 1 with the object and when the calculated TTC is less than a predetermined time, determine that the risk of collision between the vehicle 1 and the object is high and operate the headlamp 15 to irradiate light to the corresponding object. Furthermore, the controller 100 may be configured to determine whether the distance between the object and the vehicle 1 increases or decreases based on the moving direction and moving speed of the object, and accordingly adjust an amount and direction of light to be irradiated to the object.

Referring to FIG. 8, when the second pedestrian P2 is moving in the direction ①, the distance to the vehicle 1 increases, and thus, the TCC of the vehicle 1 with the second pedestrian P2 calculated by the controller 100 may be greater or longer than the predetermined time period, in which case the controller 100 may be configured to determine that the risk of collision is low and reduce an amount of light to be irradiated from the headlamp 15 to the second pedestrian P2 or may prevent irradiation of light. In other words, the collision risk is not imminent and thus, the irradiation of light is unnecessary.

On the contrary, when the second pedestrian P2 is moving in the direction ②, the distance to the vehicle 1 decreases, and thus, the TCC of the vehicle 1 with the second pedestrian P2 calculated by the controller 100 may be less than the predetermined time period, in which case the controller 100 may be configured to determine that the risk of collision is high and increase an amount of light to be irradiated from the headlamp 15 to the second pedestrian P2 or may move up the time to irradiate light (e.g., may irradiate the light sooner). In other words, the collision is imminent and thus, the light irradiation is required.

Furthermore, the controller 100 may be configured to operate the headlamp 15 to irradiate an increased amount of light to the second pedestrian P2 or move up the time to irradiate light when the detected distance between the vehicle 1 and the second pedestrian P2 is less than a particular distance (e.g., a high risk distance), and operate the headlamp 15 to irradiate a reduced amount of light to the second pedestrian P2 or delay the time to irradiate light when the distance is greater than a particular distance (e.g., a safe distance). Accordingly, the controller 100 may be configured to obtain information regarding a position and moving speed of the object detected by the detecting sensor 200 in real time to determine the risk of collision of the vehicle 1 with the object, and adjust the amount or time to irradiate light to the object according to the risk of collision.

Figure 9:
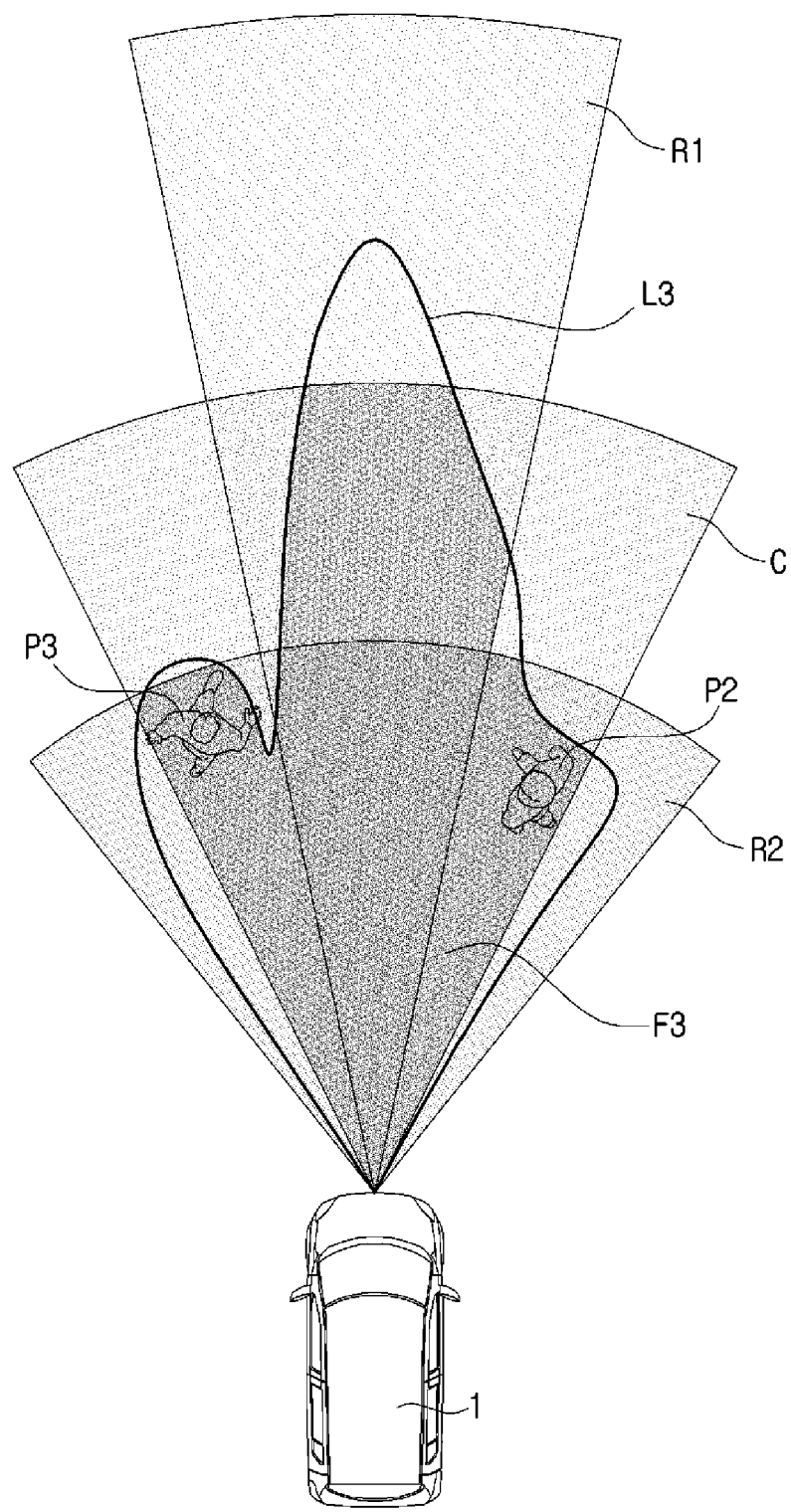
FIG. 9 shows lighting direction from a headlamp varying by direction of objects, according to an exemplary embodiment of the present disclosure.
Figure 10:
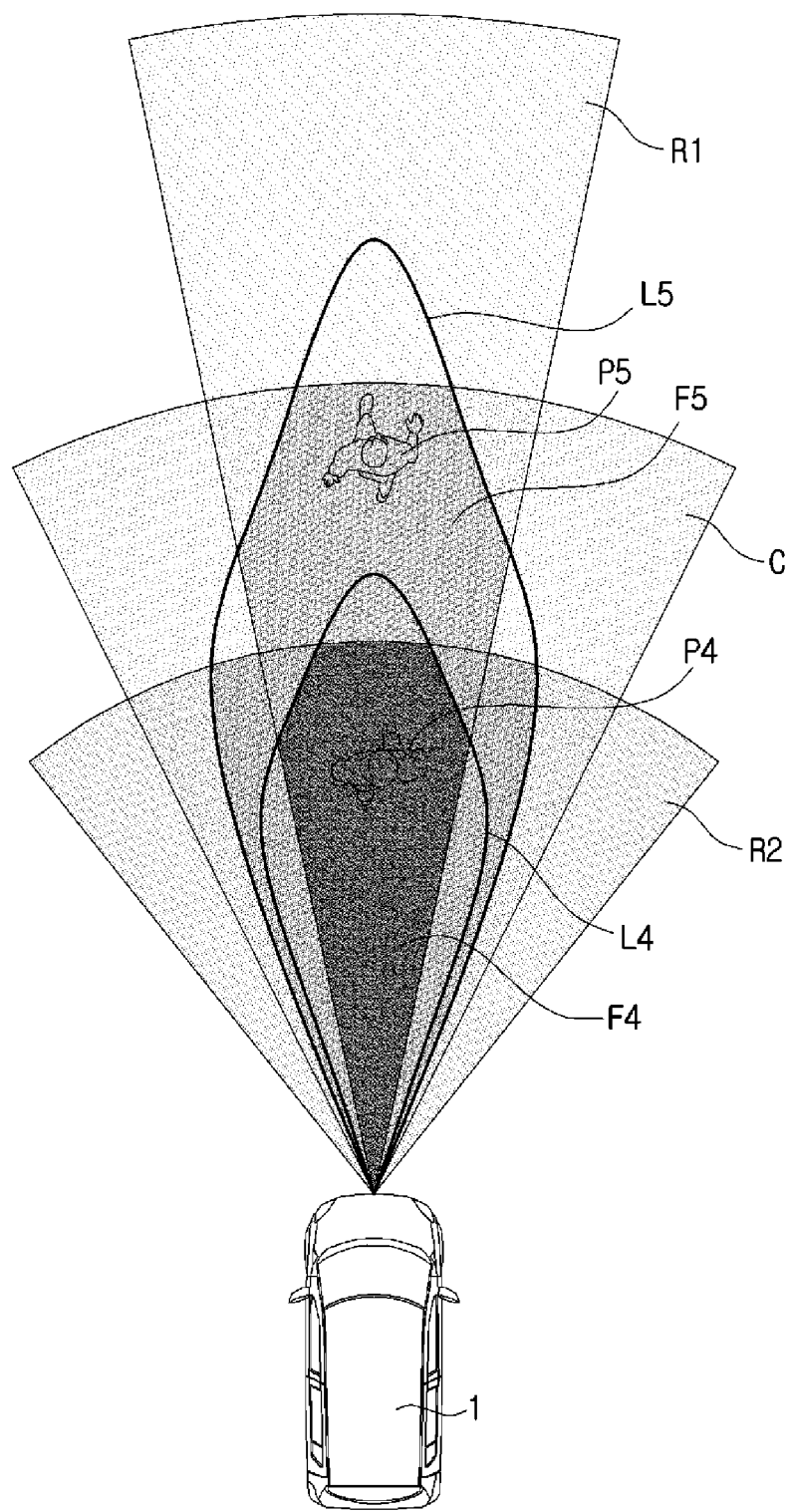
FIG. 10 shows the amount of irradiation of light from a headlamp varying by distance to an object, according to an exemplary embodiment of the present disclosure.

FIG. 9 shows lighting direction from a headlamp varying by direction of an object, according to an exemplary embodiment of the present disclosure, and FIG. 10 shows the amount of irradiation of light from a headlamp varying by distance to an object, according to an exemplary embodiment of the present disclosure.

While the vehicle 1 is being driven at night, the controller 100 may be configured to transmit a control signal to operate the headlamp 15 to irradiate light toward the object based on the information regarding a position of the object detected by the detection sensor 200. Furthermore, when there are multiple objects detected by the detection sensor 200, the controller 100 may be configured to operate the headlamp 15 to irradiate light toward the respective objects.

For example, the headlamp 15 may be configured to irradiate light toward second and third pedestrians P2 and P3 in the short-range detection area R2 of the detection sensor 200. The controller 100 may be configured to adjust the amount of light to be irradiated from the headlamp 15 and the time to irradiate the light based on the respective TTC of the vehicle 1 with the second and third pedestrians P2 and P3. Furthermore, the controller 100 may be configured to adjust the amount of light to be irradiated from the headlamp 15 and the time to irradiate the light based on the respective distances to the second and third pedestrians P2 and P3 from the vehicle 1.

Once light is irradiated from the headlamp 15 to the second and third pedestrians P2 and P3, when the capturer 350 captures an image for an area L3 illuminated by the irradiated light, a bright image with high resolution may be captured and obtained due to lighting from the headlamp 15. Accordingly, for the second and third pedestrians P2 and P3 located in a common area F3 between the capture area C of the capturer 350 and the short-range detection area R2 of the detection sensor 200, the controller 100 may use a combination of information obtained by the detecting sensor 200 and information obtained by the capturer 350. Specifically, the controller 110 may more accurately detect positions and moving speeds of the second and third pedestrians P2 and P3 even while the vehicle 1 is being driven at night, based on the information regarding positions and speeds of the second and third pedestrians P2 and P3 detected by the detection sensor 200 and image recognition information of the second and third pedestrians P2 and P3 captured by the capturer 350.

Referring to FIG. 10, the controller 100 may be configured to adjust the amount of light to be irradiated from the headlamp 15 toward an object detected by the detection sensor 200 based on a distance between the object and the vehicle 1. For example, while the vehicle is being driven at night, a fifth pedestrian P5 in the long-range area R1 and a fourth pedestrian P4 in the short-range area R2 may be detected by the detection sensor 200 and information regarding positions and moving speeds of the detected pedestrians may be obtained.

Particularly, the controller 100 may be configured to operate the headlamp 15 to irradiate light toward the fourth and fifth pedestrians P4 and P5 (e.g., toward a direction where the pedestrians are located) based on a distance between the fourth pedestrian P4 and the vehicle 1 and a distance between the fifth pedestrian P5 and the vehicle 1. In this regard, since the fourth pedestrian P4 is closer to the vehicle 1 than the fifth pedestrian P5 is, the controller 100 may be configured to output a less amount of light to be irradiated toward the fourth pedestrian P4 than toward the fifth pedestrian P5. Specifically, the controller 15 may be configured to operate the headlamp 15 to irradiate a low beam light that may irradiate light across the relatively short range for the pedestrian P4, and operate the headlamp 15 to irradiate light in a proper light distribution pattern based on the driving speed, driving direction, road surface condition, and brightness of the surroundings of the vehicle 1.

The controller 100 may further be configured to operate the headlamp 15 to irradiate a high beam light that may irradiate light across the relatively long range for the fifth pedestrian P5, thereby securing a field of view of long distance where the fifth pedestrian P5 located. In addition, the controller 100 may be configured to operate the headlamp 15 to irradiate an increased amount of light toward the fifth pedestrian P5 at a relatively greater distance than toward the fourth pedestrian P4.

Once light is irradiated from the headlamp 15 toward the respective fourth and fifth pedestrians P4 and P5, when the capturer 350 captures images for areas L4 and L5 illuminated by the irradiated light, a bright image with high resolution may be captured and obtained due to lighting from the headlamp 15. Accordingly, for the fourth pedestrian P4 located in a common area F4 between the capture area C of the capturer 350 and the short-range detection area R2 of the detection sensor 200, the controller 100 may use a combination of information obtained by the detecting sensor 200 and information obtained by the capturer 350. Furthermore, for the fifth pedestrian P5 located in a common area F5 between the capture area C of the capturer 350 and the long-range detection area R1 of the detection sensor 200, the controller 100 may use a combination of information obtained by the detecting sensor 200 and information obtained by the capturer 350.

Specifically, the controller 110 may more accurately detect positions and moving speeds of the fourth and fifth pedestrians P4 and P5 even while the vehicle 1 is being driven at night, based on the information regarding positions and speeds of the fourth and fifth pedestrians P4 and P5 detected by the detection sensor 200 and image recognition information of the fourth and fifth pedestrians P4 and P5 captured by the capturer 350.

Figure 11:
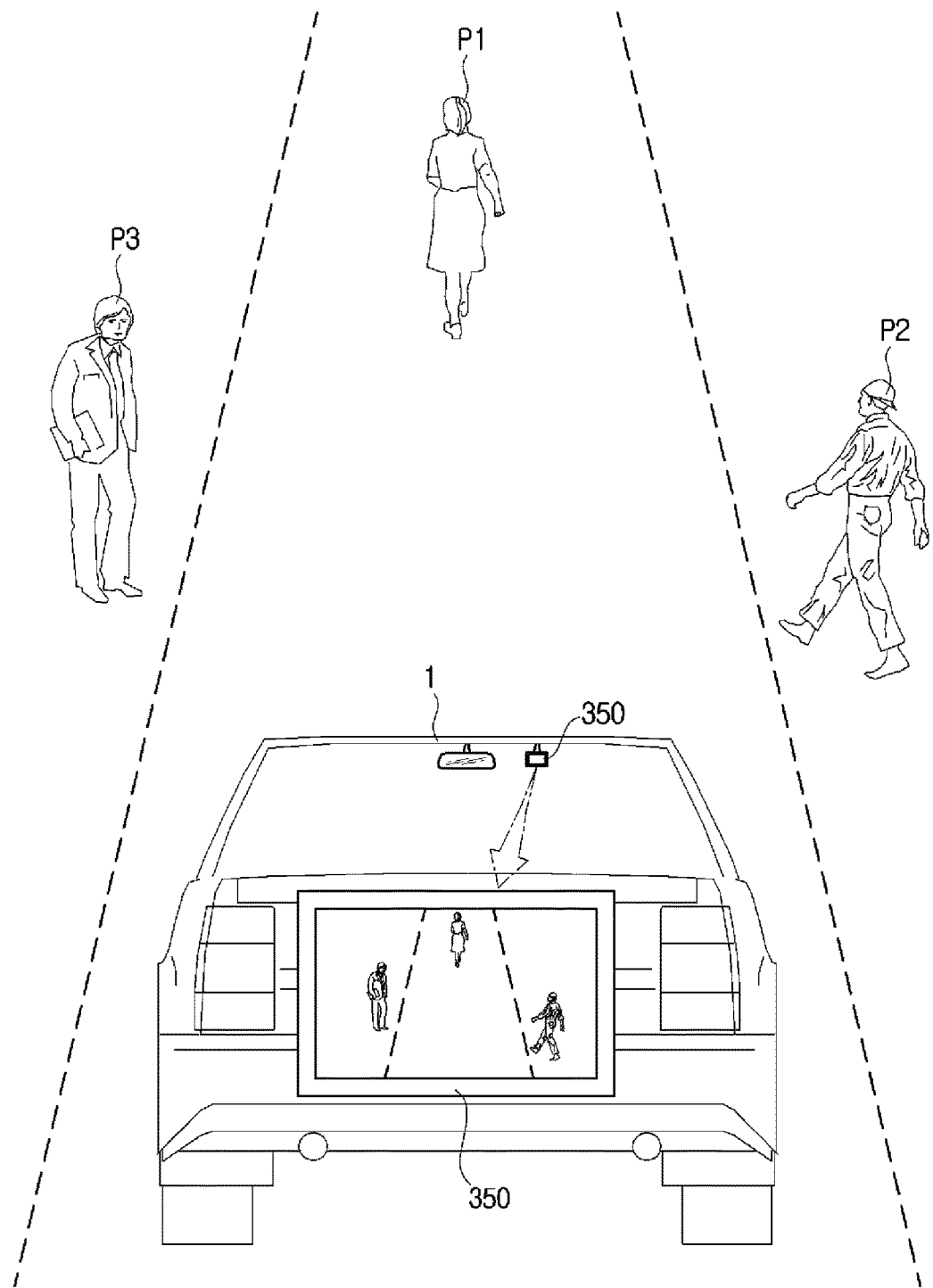
FIG. 11 shows how a capturer obtains image information by detecting an object around a vehicle, according to an exemplary embodiment of the present disclosure.

FIG. 11 shows how a capturer obtains image information by detecting an object around a vehicle, according to an exemplary embodiment of the present disclosure. While the vehicle 1 is being driven at night, the headlamp 15 may be configured to irradiate light toward an object detected by the detection sensor 200, allowing the capturer 350 to capture and obtain a bright image of the object with a high resolution.

As shown in FIG. 11, the type of objects captured by the capturer 350 may be determined to be pedestrians P1, P2, P3 through recognition of the image of the objects. The controller 100 may be configured to determine an object in front of the vehicle 1 to be subject to collision avoidance control, based on information regarding position and speed of the object obtained by the detection sensor and the image of the object captured by the capturer 350. Specifically, the controller 100 may be configured to obtain more accurate information regarding a position and speed of an object based on a combination of the image information of the object captured by the capturer 350 and detection information of the detection sensor 200, and transmit a signal to adjust the driving speed of the vehicle 1 to avoid collision based on TCC of the vehicle 1 with the object determined to be subject to collision avoidance control. Particularly, the speed controller 70 of the vehicle 1 may be configured to adjust the driving speed of the vehicle 1 based on the control signal transmitted from the controller 100, and avoid collision of the vehicle 1 with the object.

While the vehicle is being driven at night, the controller 100 may be configured to operate the headlamp 15 to irradiate light toward an object detected by the detection sensor 200 to solve the problem of the capturer unable to capture a clear image of the object due to low illumination around the vehicle 1 although the object is detected by the detection sensor 200. Once the headlamp 15 irradiates light to the object, the capturer 350 may be configured to capture the object and obtain more accurate image information of the object, and the controller 100 may be configured to perform collision avoidance control with the object based on the information regarding a position and moving speed of the object detected by the detection sensor 200 and the image information of the object captured by the capturer 350.

Figure 12:
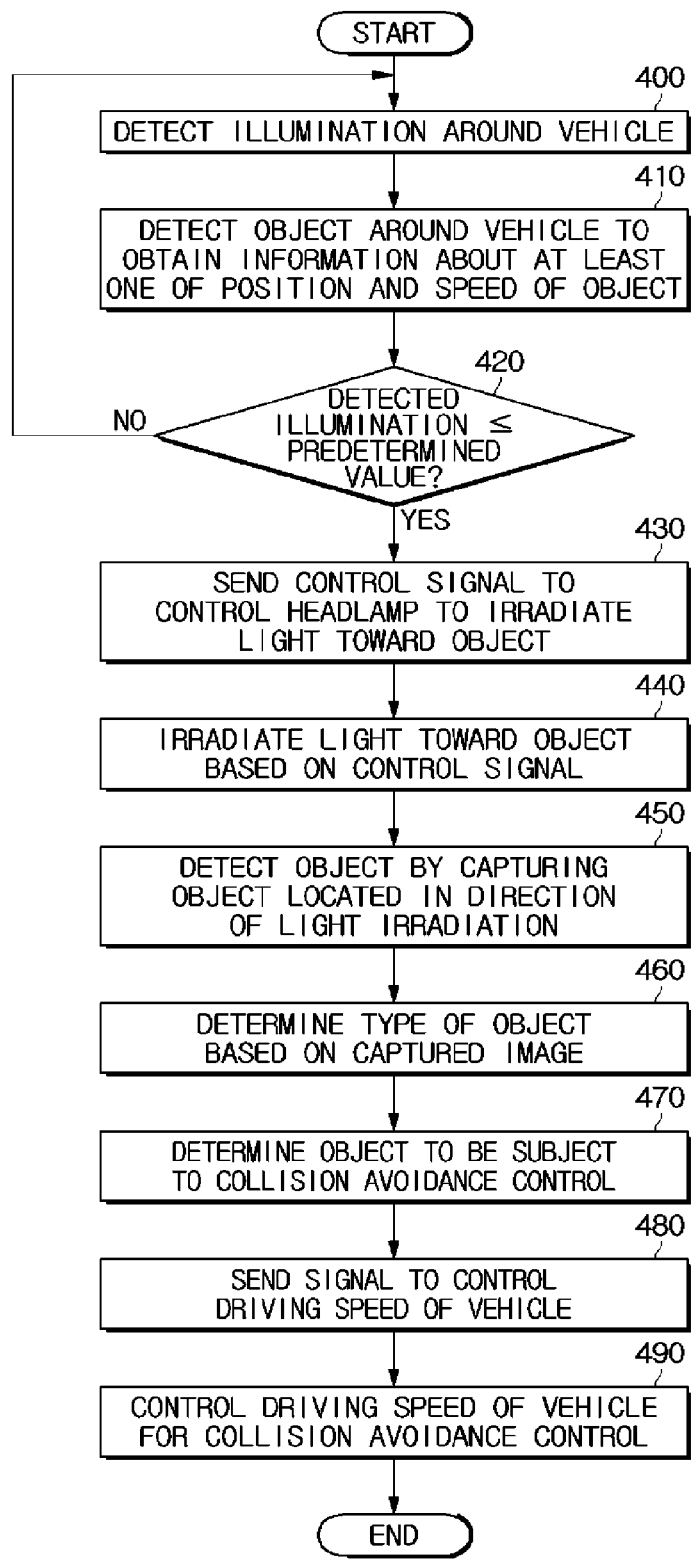
FIG. 12 is a flowchart illustrating a method for controlling a vehicle, according to an exemplary embodiment of the present disclosure.

FIG. 12 is a flowchart illustrating a method for controlling a vehicle, according to an exemplary embodiment of the present disclosure. Particularly, the optical sensor 250 may be configured to detect illumination around the vehicle 1, in 400, and the detection sensor 200 may be configured to detect an object around the vehicle 1 to obtain information regarding at least one of position and speed of the object, in 410.

The controller 100 may then be configured to compare the illumination detected by the optical sensor 250 with data regarding predetermined illumination, in 420, and when the detected illumination is less than the predetermined illumination value, the controller 100 may be configured to determine that the vehicle 1 is being driven at night or through a dark light region. When the detected illumination is less than the predetermined illumination value, the controller 100 may be configured to calculate TCC of the vehicle 1 with the object based on the information regarding at least one of position and speed of the vehicle 1 detected by the detection sensor 200. Furthermore, the controller 100 may be configured to transmit a control signal to operate the headlamp 15 to irradiate light toward the object, in 430.

Additionally, the headlamp 15 may be configured to irradiate light toward the object based on the control signal, in 440, and the capturer 350 may be configured to capture and detect the object located in the direction in which the light is irradiated, and obtain image information of the object, in 450. The capturer 350 may further be configured to determine a type of object based on the image taken of the object, in 460, and the controller 100 may be configured to determine the object to be subject to collision avoidance control based on the information regarding at least one of position and speed of the object obtained by the detection sensor 200 and the image of the object captured by the capturer 350, in 470. The controller 100 may be configured to transmit a signal to adjust the driving speed of the vehicle 1 to avoid collision of the vehicle 1 with the object determined to be subject to collision avoidance control, in 480, and the speed controller 70 may be configured to adjust the driving speed of the vehicle 1 based on the control signal to avoid collision of the vehicle 1 against the object.

According to exemplary embodiments of the present disclosure, image capturing performance of a imaging device may be improved even in low light conditions around the vehicle driven at night, and collision avoidance may be effectively achieved by more accurately detecting an object using both the imaging device and detection sensor.

The exemplary embodiments of the present disclosure have thus far been described with reference to accompanying drawings. It will be obvious to people of ordinary skill in the art that the present disclosure may be practiced in other forms than the exemplary embodiments as described above without changing the technical idea or essential features of the present disclosure. The above exemplary embodiments are only by way of example, and should not be interpreted in a limited sense.

DESCRIPTION OF THE SYMBOLS

1: VEHICLE
15: HEADLAMP
70: SPEED CONTROLLER
80: SPEED DETECTOR
90: STORAGE
100: CONTROLLER
200: DETECTION SENSOR
250: OPTICAL SENSOR
350: CAPTURER

What is claimed is:
1. A vehicle, comprising:
an optical sensor configured to detect illumination around the vehicle;
a detection sensor configured to detect an object around the vehicle to obtain at least one of position information of the object and speed information of the object; and
a controller configured to transmit a control signal to operate a headlamp to irradiate light toward the object based on the position information of the object when the illumination around the vehicle detected by the optical sensor is less than a predetermined illumination value of pre-stored illumination data, wherein the headlamp is configured to irradiate light toward the object based on the control signal, and the controller is further configured to:
- calculate a time to collision (TCC) of the vehicle with the object based on at least one of the position information of the object and the speed information of the object, and
- transmit the control signal to operate the headlamp to irradiate light toward the object when the TCC is less than a predetermined time.

2. The vehicle of claim 1, wherein the controller is configured to:
- adjust an amount of light to be irradiated from the headlamp toward the object, based on a distance from the vehicle to the object.

3. The vehicle of claim 1, wherein the controller is configured to:
- adjust an amount of light to be irradiated from the headlamp toward the object, based on the TCC of the vehicle with the object.

4. The vehicle of claim 1, further comprising:
- a capturer configured to capture an image of an object located in a direction in which the light from the headlamp is irradiated, to detect the object.

5. The vehicle of claim 4, wherein the capturer is configured to:
- determine a type of object based on the image captured of the object.

6. The vehicle of claim 4, wherein the controller is configured to:
- determine the object to be subject to collision avoidance control based on at least one of the position information of the object and the speed information of the object and based on the image of the object captured by the capturer.

7. The vehicle of claim 1, wherein the controller is configured to:
- adjust the speed of the vehicle based on the TCC of the vehicle with the object.

8. The vehicle of claim 7, further comprising:
- a speed controller configured to adjust the speed of the vehicle based on the control signal.

9. The vehicle of claim 1, wherein the detection sensor includes any one of a radar and Light Detection And Radar (LiDAR).

10. A method for controlling a vehicle, comprising:
- detecting, by an optical sensor, illumination around the vehicle;
- detecting, by a detection sensor, an object around the vehicle to obtain at least one of position information of the object and speed information of the object;
- calculating, by a controller, a time to collision (TCC) of the vehicle with the object based on at least one of the position information of the object and the speed information of the object;
- transmitting, by the controller, a control signal to operate a headlamp to irradiate light toward the object based on the position information of the object when the illumination around the vehicle detected by the optical sensor is less than a predetermined illumination value of pre-stored illumination data; and
- transmitting, by the controller, the control signal to operate the headlamp to irradiate light toward the object when the TCC is less than a predetermined time.

11. The method of claim 10, wherein transmitting the control signal to operate a headlamp includes:
- adjusting, by the controller, an amount of light to be irradiated from the headlamp toward the object, based on a distance from the vehicle to the object.

12. The method of claim 10, wherein transmitting the control signal to operate a headlamp includes:
- adjusting, by the controller, an amount of light to be irradiated from the headlamp toward the object, based on the TCC of the vehicle with the object.

13. The method of claim 10, further comprising:
- capturing, by an imaging device, an image of an object located in a direction in which the light from the headlamp is irradiated, to detect the object.

14. The method of claim 13, further comprising:
- determining, by the controller, a type of the object based on the image captured from the object.

15. The method of claim 13, further comprising:
- determining, by the controller, the object to be subject to collision avoidance control based on at least one of the position information of the object and the speed information of the object and based on the image of the object captured by the imaging device.

16. The method of claim 10, further comprising:
- adjusting, by the controller, the speed of the vehicle based on the TCC of the vehicle with the object.

* * * * *